(12) United States Patent
Yen et al.

(10) Patent No.: US 8,012,906 B2
(45) Date of Patent: Sep. 6, 2011

(54) HIGH-TEMPERATURE CATALYTIC MATERIAL AND METHOD FOR PRODUCING THE SAME

(75) Inventors: Fu-Su Yen, Tainan (TW); Tan-Gin Lin, Taichung (TW)

(73) Assignee: National Cheng Kung University, Tainan (TW)

( * ) Notice: Subject to any disclaimer, the term of this patent is extended or adjusted under 35 U.S.C. 154(b) by 126 days.

(21) Appl. No.: 12/406,971

(22) Filed: Mar. 19, 2009

(65) Prior Publication Data

US 2009/0192034 A1 Jul. 30, 2009

Related U.S. Application Data

(63) Continuation-in-part of application No. 11/103,517, filed on Apr. 12, 2005, now abandoned.

(30) Foreign Application Priority Data

Nov. 11, 2004 (TW) ................................ 93134530 A

(51) Int. Cl.
*B01J 21/04* (2006.01)
*C01F 7/02* (2006.01)
*C01F 7/04* (2006.01)

(52) U.S. Cl. ........................ 502/355; 423/625; 423/628

(58) Field of Classification Search .......... 423/625–631, 423/355; 502/355
See application file for complete search history.

(56) References Cited

U.S. PATENT DOCUMENTS 5,972,820 A * 10/1999 Kharas et al. ................. 501/127
6,440,187 B1 * 8/2002 Kasai et al. ..................... 51/309

* cited by examiner

*Primary Examiner* — Wayne Langel
(74) *Attorney, Agent, or Firm* — CKC & Partners Co., Ltd.

(57) ABSTRACT

A high-temperature catalytic material and a method for producing the same are disclosed. The high-temperature catalytic material is obtained by subjecting a mixture of gibbsite and boehmite in a desired weight ratio to a single dry thermal treatment in the air, without alkaline or hydrothermal treatment, so as to obtain multiphase alumina powder as the high-temperature catalytic material. The multiphase alumina powder applied in the high-temperature catalytic material can raise the temperature of phase transformation, maintain its high specific surface area when suffering high temperatures for a long time, prolongs its lifetime, and reduces the usage of noble metals, resulting in great reduction of cost.

3 Claims, 3 Drawing Sheets

HIGH-TEMPERATURE CATALYTIC MATERIAL AND METHOD FOR PRODUCING THE SAME

RELATED APPLICATIONS CROSS-REFERENCE TO RELATED APPLICATION

This application is a continuation-in-part of U.S. application Ser. No. 11/103,517, filed on Apr. 12, 2005, hereby incorporated by reference as it fully set forth herein.

FIELD OF THE INVENTION

The present invention relates to a high-temperature catalytic material and a method for producing the same, and more particularly, to a high-temperature catalytic material by using multiphase alumina powder and a method for producing the same.

BACKGROUND OF THE INVENTION

The need for special ceramic materials is steadily increasing all over the world. Among these materials, alumina exhibits some of the most superior properties of all ceramic materials: for example, high melting point and excellent wear resistance, insulation, mechanical strength and chemical stability. Thus, alumina has become one of the most popular ceramic materials in a diverse array of applications. Furthermore, alumina is easily obtained and the processing technique for making it is standardized, so it has been employed from the 1900's in the large-scale production of high-temperature refractories, insulating materials, grinding media, cutting tools, spark plugs, integrated circuit (IC) substrates, artificial tooth implants, high-voltage sodium lamps with light perviousness, catalytic materials, composite materials in dispersion phase and so on. Consequently, alumina has become one of the materials required in the processes of light and heavy industries.

The production of alumina powder having high specific surface area, which is commonly applied as a desiccants and an adsorbent for gases and organic fluids, began from the 1930's, when it was also called activated alumina. Moreover, the alumina powder having high specific surface area is applied in separating components of chemical engineering processes and treating water. Owing to alumina having chemically and thermally stable properties, the gibbsite or boehmite obtained in the Bayer process undergoes a thermal treatment for forming α-phase alumina, and various alumina transition phases, such as κ-phase, θ-phase, δ-phase and γ-phase, which are derived from the formation process of the α-phase alumina, have also become the most popular catalytic materials or catalyst carriers applied in the chemical industry. At present, alumina material serving as a catalyst can be a film coated on the surface of the carrier (such as in a catalytic converter of a car), or it can also be a sphere, a cylinder, a flake or other shape, depending on the actual requirement.

It is a need to develop alumina powders with high specific surface area that can be resistant to higher temperature environment (above 900° C.), for example, that can be used for automotive emission control systems. Monolithic catalyst systems consisting of a cellular ceramic coated with high surface area (γ-) alumina and noble metal catalysts are now widely used. The catalyst system was developed in the early 1970 and commercially utilized starting with 1975 model-year cars in US based on the Clean Air Act of 1970. For this reason, the industry at that time was required to more exactly control the engine design and the fuel/air ratio during exploring the power fuel. Moreover, a system for treating exhaust gases was further disposed on the exhaust pipe connected with the engine, for treating the exhaust gases before exhausting, so as to reduce the amount of harmful gases. The above system for treating exhaust gases is now called the "catalytic converter". In the typical process, the honeycomb-like porous monolithic carrier, which is the cordierite-based material, is firstly produced, and then the pore walls of the carrier are coated with a film that contains noble metal micro-particles of palladium (Pd), platinum (Pt) and rhodium (Rh) in γ-phase, δ-phase and θ-phase alumina, for example. The transition alumina phases are obtained by thermally treating boehmite, and they serve as the carriers for the catalytic material of Pd, Pt and Rh metal micro-particles. In addition, because of increasing environmental protection requirements and more stringent regulations for reducing harmful gases, the functional requirements for catalytic converters of exhaust gases is also increasing.

With 2005 as the deadline, there is an essential need for obtaining a material for converting automobile exhaust that can be maintained at the desired high specific surface area when suffering higher temperatures such as 900 to 1000 degrees Celsius (° C.). The commercial high-temperature catalytic alumina ($Al_2O_3$) materials for automobile emission control include various transition alumina phases that are mainly derived from boehmite. These transition alumina phases will undergo the route from boehmite to γ-, δ-, θ-, then finally to α-alumina, in which the final α-$Al_2O_3$ may be formed at the temperature around 1000~1100° C. However, when the α-$Al_2O_3$ formation occurs, it usually accompanies with a drastic surface area reduction of the catalytic alumina material, resulting in the function deterioration of the catalyst converter. The working temperature of catalyst converter is normally above 800° C., and more recently reaching 1000° C. to 1100° C. for meeting the new State levels. In this case, the catalytic alumina material has serious surface area reduction problem at such temperature range and cannot meet the market requirement. Thus various methods have been employed to retard the surface area reduction, extending its lifetime to meet the environmental regulations.

U.S. Patent Application No. 20040043898 discloses a catalyst carrying a catalyst material containing an alkaline metal and/or an alkaline earth metal on a carrier and used as an $NO_x$ trap catalyst for purifying automobile exhaust gas and the like comprises alumina incorporated into the carrier and/or placed between the carrier and the catalyst material, thereby suppressing the deterioration of the carrier caused by the metals such as Li, Na, K and Ca to be used as an alkaline metal and/or an alkaline earth metal and enabling it to be used for a extended period of time.

U.S. Pat. No. 6,846,466 discloses a catalyst for purifying an exhaust gas, which includes an upstream side catalyst and a downstream side catalyst. The upstream side catalyst is disposed on an upstream side with respect to an exhaust gas flow, and the downstream side catalyst is disposed on a downstream side with respect thereto. The upstream side catalyst includes a first loading layer, being composed of an alumina containing Ba and La at least, and a first noble metal, being held by the first loading layer and being at least one member selected from the group consisting of Pd, Pd and Rh and Pd and Pt. Alternatively, in addition to the aluminum, the first loading layer can be composed of Ce, a solid solution of Ce and Zr and a solid solution of Ce, Zr and Y in an amount as less as possible. The downstream side catalyst includes a second loading layer, being composed of at least one member selected from the group consisting of an alumina containing La, Ce, a solid solution of Ce and Zr and a solid solution of Ce, Zr and Y, and a second noble metal, being held by the second loading layer and being composed of at least one member selected from the group consisting of Pt, Pd and Rh.

U.S. Pat. No. 6,623,716 discloses an exhaust gas purifying catalyst for purifying exhaust gas discharged from an automotive internal combustion engine. The exhaust gas purifying catalyst comprises at least one noble metal selected from the group consisting of platinum, palladium and rhodium; and boehmite alumina serving as a base material. In this exhaust gas purifying catalyst, nitrogen oxides in exhaust gas from the engine is trapped to the exhaust gas purifying catalyst when exhaust gas is in a lean region and is reduced into nitrogen by the exhaust gas purifying catalyst when exhaust gas is in a stoichiometric region or a rich region.

U.S. Pat. No. 5,439,865 discloses a catalyst for exhaust gas purification, which is hereby incorporated by reference. The catalyst for exhaust gas purification comprises a heat-resistant inorganic monolith carrier and a catalyst layer loaded thereon. The catalyst layer includes a catalyst composition containing at least one noble metal selected from Pt, Pd and Rh, as an active catalyst component, and active alumina. The catalyst composition has a specific surface area of at least 50 $m^2/g$ and a porosity of at least 50%. This catalyst for exhaust gas purification contains noble metal(s) in a well dispersed state, has excellent high-temperature durability, and is low in thermal deterioration of catalyst performance. Hence, the catalyst can be suitably used as a converter installed in engine manifolds of gasoline engine automobiles, or as a heater having improved purification ability for the exhaust gases emitted from automobiles during their cold start.

U.S. Pat. No. 4,780,447 discloses a catalyst, which is capable of controlling not only HC, CO and $NO_x$, but also $H_2S$ emission from the tail pipe of catalytic converter-equipped automobiles, which is hereby incorporated by reference. The catalyst is made of noble metals promoted with ceria-rich rare earth oxides, preferably doubly promoted along with alkali metal oxides, and oxides of nickel and/or iron as an $H_2S$ gettering ingredient. The oxides of nickel and/or iron are present in an $H_2S$ gettering effective amount and in an amount up to 10 wt %. The alumina support can have additionally from 0 to 20% $SiO_2$ present.

However, the commercial catalyst substrates cannot be used under such high temperatures for a long time. The reason is described as above, which is mainly that crystallite size growth accompanied with phase transformations of the transition alumina occurs at such high temperatures, resulting in the rapid reduction in the specific surface area of the alumina substrate. As the catalysis area for the exhaust gases per unit time is decreased, the catalyst substrate suffers a substantial loss of its catalyzing function, followed by the shortened lifetime of the converter.

Accordingly, as for the catalytic converter of the car, there is a need for an alumina carrier material capable of maintaining its high specific surface area when suffering high temperatures for a long time, so as to satisfy the further requirement of the new generation.

SUMMARY OF THE INVENTION

It is an aspect of the present invention to provide a high-temperature catalytic material and a method for producing the same, which subjects a mixture of gibbsite and boehmite in a desired weight ratio to a single dry thermal treatment in the air, without alkaline, hydrothermal treatment or addition of noble metals, so as to obtain multiphase alumina powder of a desired composition as the high-temperature catalytic material. Since the gibbsite-derived transition alumina phases will serve to suppress crystal growth of the boehmite derived transition alumina phases. For examples, κ- or χ-phase alumina powder derived from gibbsite will serve to suppress phase transformation of θ-phase to α-phase alumina (derived from boehmite). Thus it is possible for the multiphase alumina powder applied in the high-temperature catalytic material can raise the temperature of phase transformation, maintain its high specific surface area when suffering high temperatures for a long time, prolongs its lifetime, and especially reduces the usage of noble metals, resulting in great reduction of the process cost.

According to the aforementioned aspect of the present invention, there is provided a high-temperature catalytic material. The high-temperature catalytic material may include multiphase alumina powder obtained by subjecting a mixture of gibbsite and boehmite in a weight ratio of 1:99 to 10:90 to a single dry thermal treatment in the air, without alkaline or hydrothermal treatments. The multiphase alumina powder may include an α-phase alumina powder ranging from less than (<) 1 to 10% by weight, a first multiphase alumina powder ranging from 40 to 98% by weight and a second multiphase alumina powder ranging from 1 to 20% by weight. A particle size of the aforementioned α-phase alumina powder is in a range from 50 to 200 nanometers (nm). The first multiphase alumina powder may include, for example, a θ-phase alumina powder and δ-phase alumina powder and/or γ-phase alumina powder, and the δ-phase alumina powder has an amount ranging from 20% to 40% by weight in the multiphase alumina powder. The second multiphase alumina powder may include, for example, κ-phase alumina powder or χ-phase alumina powder. Since the α-phase alumina powder serves to suppress crystal growth of the θ-phase alumina powder, as well as the κ-phase alumina powder serving to suppress phase transformation from the θ-phase alumina powder to the α-phase alumina powder, the catalytic material is capable for a long-term usage under a high temperature of 700 degrees Celsius to 1000 degrees Celsius and maintained at a specific surface area ranging from 60 $m^2/g$ to 100 $m^2/g$.

Besides, according to the aforementioned aspect of the present invention, there is further provided a method for producing a high-temperature catalytic material. A starting material, such as a mixture of gibbsite and boehmite in a weight ratio of 1:99 to 10:90, is firstly provided. Then, the starting material, composite alumina powder is subjected to a single dry thermal treatment under 500 degrees Celsius to 1100 degrees Celsius in the air for 1 to 3 hours, without alkaline or hydrothermal treatment, so as to form multiphase alumina powder as the high-temperature catalytic material, in which the high-temperature catalytic material comprises an α-phase alumina powder ranging from <1 to 10% by weight, a first multiphase alumina powder ranging from 40 to 98% by weight and a second multiphase alumina powder ranging from 1 to 20% by weight. A particle size of the aforementioned α-phase alumina powder is in a range from 50 to 200 nm. The first multiphase alumina powder may include, for example, a θ-phase alumina powder and δ-phase alumina powder and/or γ-phase alumina powder. The second multiphase alumina powder may include, for example, κ-phase alumina powder and/or χ-phase alumina powder. Since the α-phase alumina powder and the κ-phase alumina powder serves to suppress crystal growth of the θ-phase alumina powder, as well as to suppress phase transformation from the θ-phase alumina powder to α-phase alumina powder. The catalytic material is capable for a long-term usage under a high temperature of 700 degrees Celsius to 1000 degrees Celsius and maintained at a specific surface area ranging from 60 m²/g to 100 m²/g.

The high-temperature catalytic material and the method for producing the same utilize a mixture of gibbsite and boehmite in a desired weight ratio to a single dry thermal treatment in the air, without alkaline, hydrothermal treatment or addition of noble metals, so as to obtain multiphase alumina powder of a desired composition as the high-temperature catalytic material. Since the multiphase alumina powder can raise the temperature of phase transformation, and make it capable of maintaining its high specific surface area when suffering higher temperatures for a long time. Therefore, as the multiphase alumina powder of the present invention is applied as the high-temperature catalytic material, it provides the high specific surface area required of the catalysis and prolongs its lifetime, resulting in great reduction of cost.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
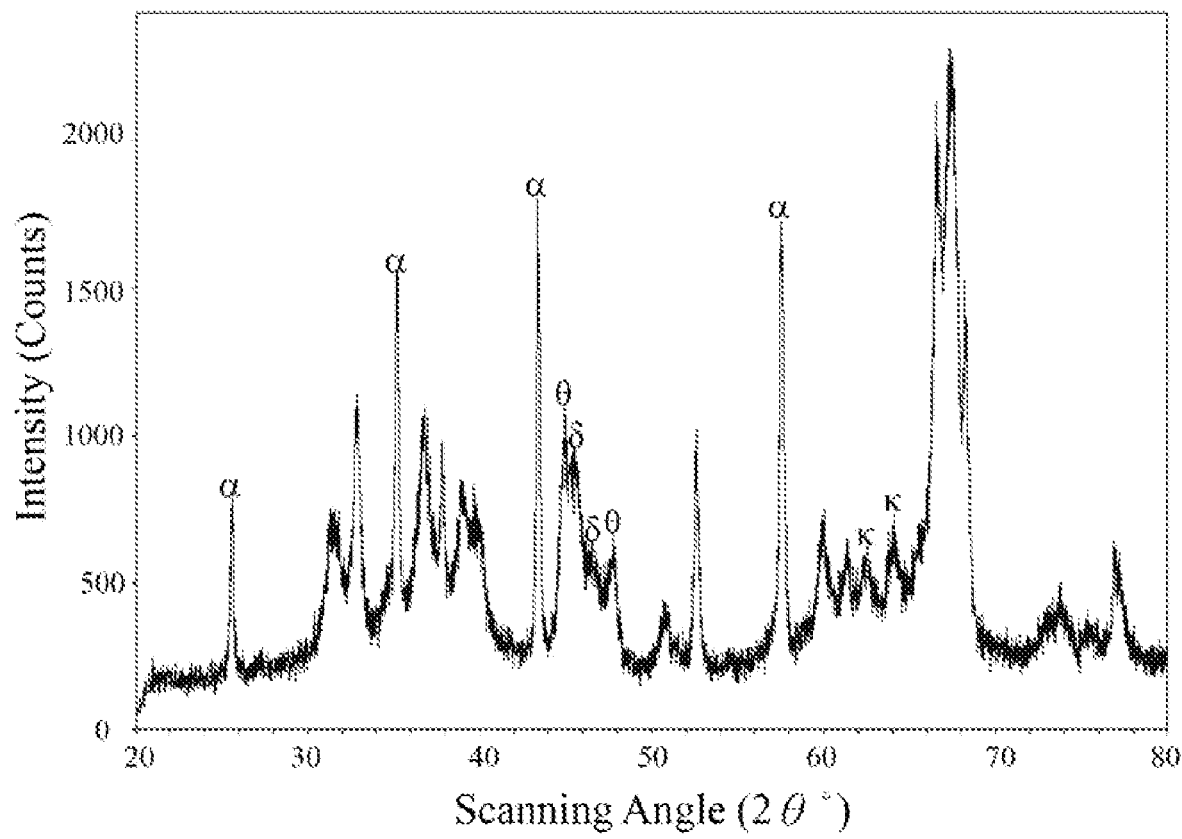
FIG. 1 depicts an XRD pattern of the multiphase alumina powder according to EXAMPLE 1 of the present invention.

The present invention provides a high-temperature catalytic material and a method for producing the same, which utilize a mixture of gibbsite and boehmite in a desired weight ratio to a single dry thermal treatment in the air, without alkaline, hydrothermal treatment or addition of noble metals, so as to obtain multiphase alumina powder of a desired composition as the high-temperature catalytic material. Since the multiphase alumina powder can raise the temperature of phase transformation, capable of maintaining its high specific surface area when suffering higher temperatures for a long time. Hereinafter, the high-temperature catalytic material and the method for producing the same of the present invention are more explicitly and completely clarified in the following description.

In an exemplary embodiment of the present invention, the grain growth of a ceramic body in the catalytic material can be effectively slowed-down or prevented by using mixture of two independent routes of transition alumina phases. More specifically, the two independent routes of transition alumina phases are derived from gibbsite and boehmite, respectively. During boehmite-series transformation, the phase transformation occurs sequentially from boehmite to γ-, δ-, θ-, and finally to α-alumina as the temperature increases, being represented as the following route (I):

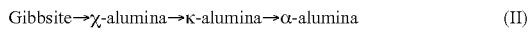

boehmite→γ-alumina→δ-alumina→θ-alumina→α-alumina (I)

On the other hand, during gibbsite-series transformation, the main phase transformation occurs sequentially from gibbsite to χ-, κ-, and finally to α-alumina as the temperature increases, being represented as the following route (II):

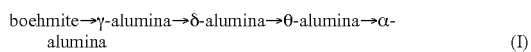

Gibbsite→χ-alumina→κ-alumina→α-alumina (II)

Although gibbsite crystallites with sizes larger than 1 micrometer may dehydrated to form boehmite and take the route of phase transformation as boelimite does.

The two routes of phase transition of alumina derived from gibbsite and boehmite respectively are undergoing individually and dependently. In this exemplary embodiment, gibbsite and boehmite may be mixed in a desired weight ratio, for example, by directly mixing the two mineral powders (gibbsite and boehmite) in a desired weight ratio, or by dehydrating gibbsite powders to obtain the mixture of gibbsite and boehmite in a desired weight ratio (during the incomplete dehydration, only partial gibbsite is converted to boehmite and water, i.e. gibbsite→boehmite+$H_2O$). Since the presence of κ-alumina derived from gibbsite (gibbsite-series) can prevent θ-alumina from transforming to α-alumina, both (i.e. θ- and α-alumina) of which are derived from boehmite (boehmite-series). Thereby, a composite powder, which is homogeneous mixture of the two above series of transition alumina derived from gibbsite and boehmite respectively, can be effectively maintain the high specific surface area at higher temperatures.

In an exemplary embodiment of the present invention, a starting material is firstly provided, in which the starting material may comprise a mixture of gibbsite and boehmite. In an embodiment, the starting material may comprise a mixture of gibbsite and boehmite in a weight ratio of 1:99 to 10:90. In another embodiment, the starting material may comprise a mixture of gibbsite and boehmite in a weight ratio of 5:95.

And then, the starting material is subjected to a single dry thermal treatment under 500 degrees Celsius to 1100 degrees Celsius in the air for 1 to 3 hours, without alkaline or hydrothermal treatment, so as to form multiphase alumina powder as the high-temperature catalytic material. In an embodiment, the high-temperature catalytic material comprises an α-phase alumina powder ranging from <1 to 10% by weight, a first multiphase alumina powder ranging from 40 to 98% by weight and a second multiphase alumina powder ranging from 1 to 20% by weight. A particle size of the aforementioned α-phase alumina powder is in a range from 50 to 200 nm. The first multiphase alumina powder may include, for example, a θ-phase alumina powder and δ-phase alumina powder and/or γ-phase alumina powder. The second multiphase alumina powder may include, for example, a κ-phase alumina powder and/or x-phase alumina powder. Since the α-phase alumina powder serves to suppress crystal growth of the θ-phase alumina powder, as well as the κ-phase alumina powder serving to suppress phase transformation from the θ-phase alumina powder to the α-phase alumina powder, the resulted catalytic material is capable for a long-term usage under a high temperature of 700 degrees Celsius to 1000 degrees Celsius and maintained at a specific surface area ranging from 60 m²/g to 100 m²/g.

Specifically, in another exemplary embodiment of the present invention, the multiphase alumina powder applied in the high-temperature catalytic material is obtained by directly mixing with alumina powders having various transition phases in the aforementioned ratio in absence of water. Consequently, with respect to the requirement of components or formulas, the multiphase alumina powder of the present invention is more flexible than those of the prior art.

The characteristic of the present invention is based on the formation the α-phase alumina related to the critical crystallite size of the θ-phase (or κ-phase) alumina during the phase transformation. When the crystallite does not reach the critical crystallite size, the phase transformation rarely occurs. Moreover, one alumina phase can suppress the phase transformation of other alumina phases in multiphase alumina powder, for example, the coalescence reaction is hard to occur between the different alumina phases, such as the θ-phase alumina and the α-phase alumina, so the growth of the θ-phase alumina can be restrained in the presence of the α-phase alumina during the phase transformation. Similarly, the κ-phase alumina can suppress phase transformation from the θ-phase alumina to the α-phase alumina. Consequently, the present invention utilizes the coexistence of the κ-phase, θ-phase and α-phase alumina for hindering crystallite growth of each other, resulting in raising the temperature of phase transformation and making it hard to form the α-phase alumina and thus difficult to reduce the surface area of the whole alumina powder system. Therefore, the high-temperature catalytic material of the present invention is still maintained at a high specific surface area.

Figure 2:
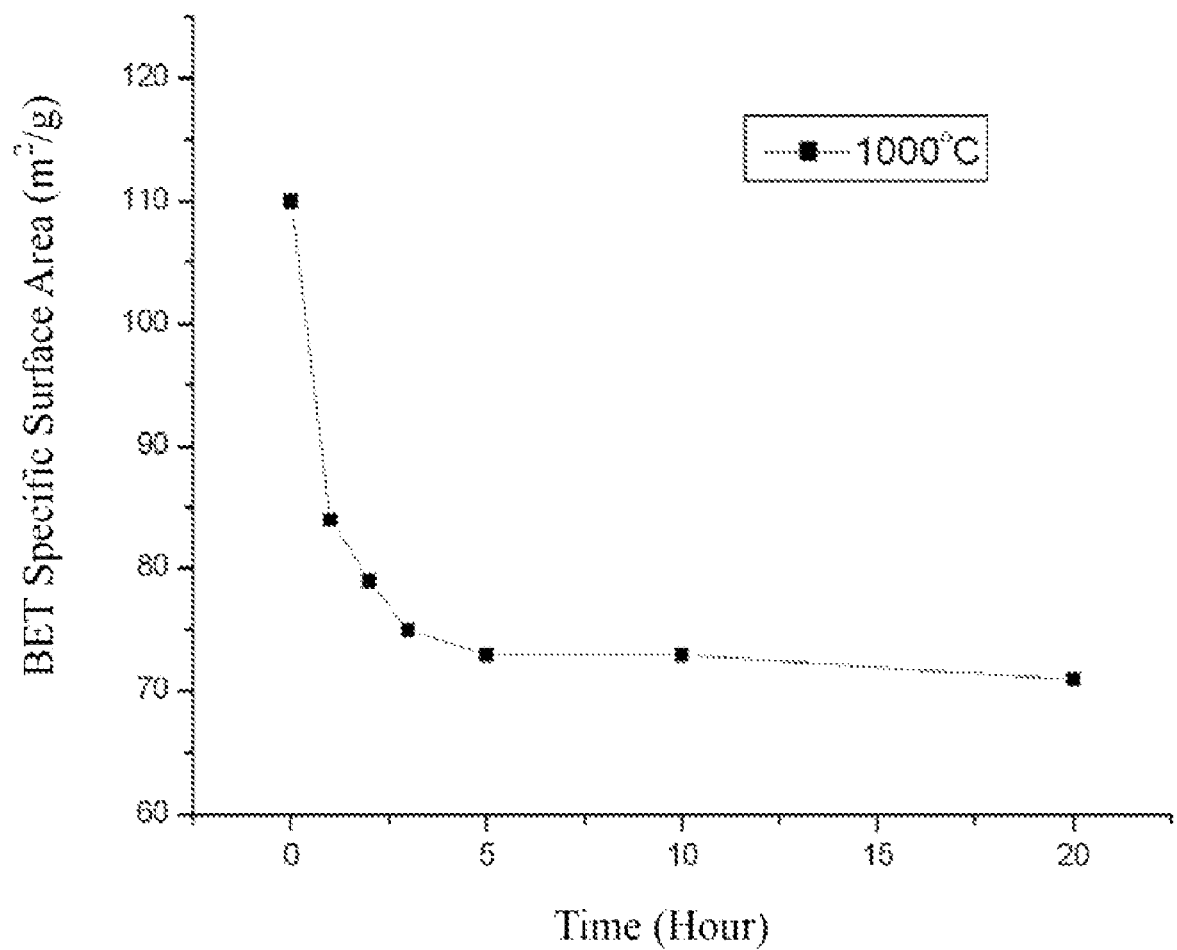
FIG. 2 depicts a diagram of the specific surface area change of the multiphase alumina powder according to EXAMPLE 1 of the present invention.
Figure 3:
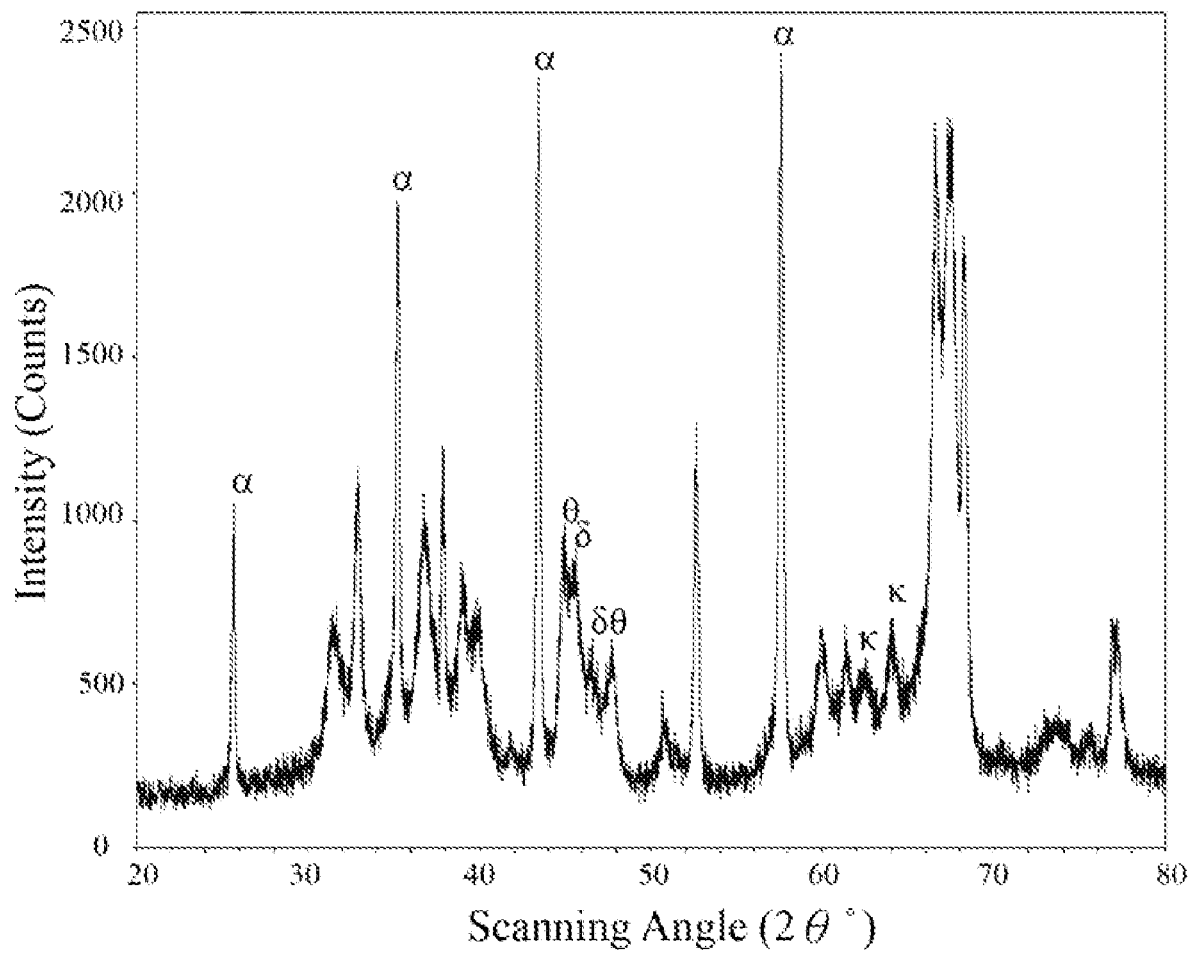
FIG. 3 depicts an XRD pattern of the multiphase alumina powder after being used at high temperatures according to EXAMPLE 1 of the present invention.

Hereinafter, the high-temperature catalytic material and the method for producing the same of the present invention are more explicitly clarified in following preferred embodiments, when taken in conjunction with FIGS. 1 to 3. However, the embodiments are merely given to illustrate various applications of the invention rather than to be interpreted as limiting the scope of the appended claims.

EXAMPLE 1

The multiphase alumina powders of EXAMPLE 1 of the present invention are ground in a wet manner for 24 hours and followed by measuring the specific surface area of the multiphase alumina powders of EXAMPLE 1, which uses the Gemini 2360 specific surface area analyzer manufactured by Micromeritics Instrument Corporation (US), according to the Brunauer Emmett Teller (BET) method. The initial specific surface area is 110 $m^2/g$.

In addition, the phase identification of the multiphase alumina powders of EXAMPLE 1 of the present invention is further examined by using the Miniflex desktop X-ray diffraction (XRD) system manufactured by Rigaku International Corporation, the scanning speed of which is 4° per minute, and the scanning angle of which is from 20° to 80°. Reference is made to FIG. 1, which depicts an XRD pattern of the multiphase alumina powder according to EXAMPLE 1 of the present invention, wherein the vertical axis refers to the intensity of X-rays, and the horizontal axis refers to the scanning angle (2θ°). In the result of the phase identification in FIG. 1, the multiphase alumina powders of EXAMPLE 1 are substantially mixed with α-phase alumina powder, θ-phase alumina powder, δ-phase alumina powder and κ-phase alumina powder. After a reexamined analysis of additional XRD phase identification, the amounts of α-phase alumina powder, θ-phase alumina powder, δ-phase alumina powder and κ-phase alumina powder are about 7 percent, about 60 percent, about 25 percent and about 8 percent by weight, respectively.

After the above analyses, the multiphase alumina powders of EXAMPLE 1 are subject to a test for long-term usage, which keeps the multiphase alumina powders under a high temperature environment of 1000° C. for varying time. Reference is made to FIG. 2, which depicts a diagram of the specific surface area change of the multiphase alumina powder according to EXAMPLE 1 of the present invention, wherein the vertical axis refers to the BET specific surface area ($m^2/g$), and the horizontal axis refers to the time (in hours). In FIG. 2, the specific surface area of the multiphase alumina powders of EXAMPLE 1 is initially slightly decreased under the high temperature environment, however, after 5 to 10 hours, the specific surface area is consistently maintained at approximately 73 $m^2/g$, and after the high temperature treatment is kept for 20 hours, the specific surface area is still maintained at about 72 $m^2/g$. That is to say, the multiphase alumina powder of EXAMPLE 1 of the present invention is still maintained at a high specific surface area under the high temperature environment.

Moreover, after the multiphase alumina powder of EXAMPLE 1 is used under the high temperature environment, the amounts of various transition phases are further evaluated by the XRD. Reference is made to FIG. 3, which depicts an XRD pattern of the multiphase alumina powder after being used under a high temperature environment according to EXAMPLE 1 of the present invention, wherein the vertical axis refers to the intensity of X-rays, and the horizontal axis refers to the scanning angle (2θ°). In the result of the phase identification in FIG. 3, after the multiphase alumina powder of EXAMPLE 1 is used under the high temperature environment, the amounts of α-phase alumina powder, θ-phase alumina powder, δ-phase alumina powder and κ-phase alumina powder in the multiphase alumina powder are changed to be about 12 percent, about 60 percent, about 20 percent and about 8 percent by weight, respectively.

EXAMPLE 2

Gibbsite and boehmite serve as starting materials, followed by a high temperature treatment of approximately 1050° C. to form the multiphase alumina powders of EXAMPLE 2. Next, after being ground in the wet manner for 24 hours, the specific surface area of the multiphase alumina powders of EXAMPLE 2 are measured by using the same specific surface area analyzer as in EXAMPLE 1, according to the BET method. The initial specific surface area is 133 $m^2/g$.

In addition, the phase identification of the multiphase alumina powders of EXAMPLE 2 of the present invention is further examined by using the XRD system of EXAMPLE 1, the scanning speed of which and the scanning angle of which are also the same as in EXAMPLE 1. After the analysis of the phase identification, the amounts of α-phase alumina powder, θ-phase alumina powder, δ-phase alumina powder and κ-phase alumina powder in the multiphase alumina powders of EXAMPLE 2 are about 1 percent, about 55 percent, about 38 percent and about 6 percent by weight, respectively.

The multiphase alumina powders of EXAMPLE 2 are subject to a test for long-term usage, which keeps the multiphase alumina powders under a high temperature environment of 1000° C. for varying time. The specific surface area of the multiphase alumina powders of EXAMPLE 2 is initially slightly decreased under the high temperature environment; however, after 5 to 10 hours, the specific surface area is consistently maintained at approximately 75 $m^2/g$, and after the high temperature treatment is kept for 20 hours, the specific surface area is still maintained at approximately 75 $m^2/g$. That is to say, the multiphase alumina powder of EXAMPLE 2 of the present invention is still maintained at a high specific surface area under the high temperature environment.

EXAMPLE 3

The multiphase alumina powders of EXAMPLE 3 of the present invention are ground in a wet manner for 24 hours, and followed by measuring the specific surface area of the multiphase alumina powders of EXAMPLE 3, which uses the same specific surface area analyzer as in EXAMPLE 1, according to the BET method. The initial specific surface area is 116 m²/g.

In addition, the phase identification of the multiphase alumina powders of EXAMPLE 3 of the present invention is further examined by using the same XRD system as in EXAMPLE 1, the scanning speed of which and the scanning angle of which are also the same as in EXAMPLE 1. After the analysis of the phase identification, the amounts of α-phase alumina powder, θ-phase alumina powder, δ-phase alumina powder and κ-phase alumina powder in the multiphase alumina powders of EXAMPLE 3 are about 6 percent, about 50 percent, about 30 percent and about 14 percent by weight, respectively.

The multiphase alumina powders of EXAMPLE 3 are subject to a test for long-term usage, which keeps the multiphase alumina powders under a high temperature environment of 1000° C. for varying time. The specific surface area of the multiphase alumina powders of EXAMPLE 3 is initially slightly decreased under the high temperature environment; however, after 5 to 10 hours, the specific surface area is consistently maintained at approximately 71 m²/g, and after the high temperature treatment is kept for 20 hours, the specific surface area is still maintained at about 70 m²/g. That is to say, the multiphase alumina powder of EXAMPLE 3 of the present invention is still maintained at a high specific surface area under the high temperature environment.

EXAMPLE 4

Mixtures of gibbsite and boehmite serve as starting materials, followed by a high temperature treatment of about 550° C. to form the multiphase alumina powders of EXAMPLE 4. Next, the specific surface area of the multiphase alumina powders of EXAMPLE 4 are measured by using the same specific surface area analyzer as used in EXAMPLE 1, according to the BET method. The initial specific surface area is 111 m²/g.

In addition, the phase identification of the multiphase alumina powders of EXAMPLE 4 of the present invention is further examined by using the same XRD system as in EXAMPLE 1, the scanning speed of which and the scanning angle of which are also the same as in EXAMPLE 1. After the analysis of the phase identification, the amounts of α-phase alumina powder, θ-phase alumina powder, δ-phase alumina powder and κ-phase alumina powder in the multiphase alumina powders of EXAMPLE 4 are about <1 percent, about 43 percent, about 30 percent and about 20 percent by weight, respectively.

The multiphase alumina powders of EXAMPLE 4 are subject to a test for long-term usage, which keeps the multiphase alumina powders under a high temperature environment of 1000° C. for various time periods. The specific surface area of the multiphase alumina powders of EXAMPLE 4 is initially slightly decreased under the high temperature environment; however, after 5 to 10 hours, the specific surface area is consistently maintained at approximately 65 m²/g, and after the high temperature treatment is kept for 20 hours, the specific surface area is slightly increased up to about 66 m²/g. That is to say, the multiphase alumina powder of EXAMPLE 4 of the present invention still is maintained at a high specific surface area under the high temperature environment.

EXAMPLE 5

The multiphase alumina powders of EXAMPLE 5 of the present invention are ground in a wet manner for 24 hours, and followed by measuring the specific surface area of the multiphase alumina powders of EXAMPLE 5, which uses the same specific surface area analyzer as used in EXAMPLE 1, according to the BET method. The initial specific surface area is 117 m²/g.

In addition, the phase identification of the multiphase alumina powders of EXAMPLE 5 of the present invention is further examined by using the same XRD system as in EXAMPLE 1, the scanning speed of which and the scanning angle of which are also the same as in EXAMPLE 1. After the analysis of the phase identification, the amounts of α-phase alumina powder, θ-phase alumina powder, δ-phase alumina powder and κ-phase alumina powder in the multiphase alumina powders of EXAMPLE 5 are about 8 percent, about 60 percent, about 25 percent and about 7 percent by weight, respectively.

The multiphase alumina powders of EXAMPLE 5 are subject to a test for long-term usage, which keeps the multiphase alumina powders under a high temperature environment of 1000° C. for varying time. The specific surface area of the multiphase alumina powders of EXAMPLE 5 is initially slightly decreased under the high temperature environment; however, after 5 to 10 hours, the specific surface area is consistently maintained at approximately 62 m²/g. And after the high temperature treatment is kept for 20 hours, the specific surface area is still maintained at about 61 m²/g. That is to say, the multiphase alumina powder of EXAMPLE 5 of the present invention is still maintained at a high specific surface area under the high temperature environment.

The results of EXAMPLES 1 to 5 are summarized in TAB. 1:

TABLE 1

| | Components (percent by weight) | | | | Specific Surface Area ($m^2/g$) | | |
| --- | --- | --- | --- | --- | --- | --- | --- |
| EXAMPLES | α | θ | δ | κ | Initiation | 10 hours | 20 hours |
| 1 | 7 | 60 | 25 | 8 | 110 | 73 | 72 |
| 2 | 1 | 55 | 38 | 6 | 133 | 75 | 75 |
| 3 | 6 | 50 | 30 | 14 | 116 | 71 | 70 |
| 4 | <1 | >49 | 30 | 20 | 111 | 65 | 66 |
| 5 | 8 | 60 | 25 | 7 | 117 | 62 | 61 |

In brief, the high-temperature catalytic material and the method for producing the same are characterized by subjecting a mixture of gibbsite and boehmite in a desired weight ratio to a single dry thermal treatment in the air, without alkaline, hydrothermal treatment or addition of noble metals, so as to obtain multiphase alumina powders of a desired composition as the high-temperature catalytic material. Since the α-phase alumina powder serves to suppress crystal growth of the θ-phase alumina powder, as well as the κ-phase alumina powder serving to suppress phase transformation from the θ-phase alumina powder to the α-phase alumina powder, the multiphase alumina powder applied in the high-temperature catalytic material can lead the crystallite growth of the resultant multiphase alumina powder to be restrained for raising the temperature of phase transformation, so as to maintain its high specific surface area when suffering high temperatures for a long-term use. Moreover, the gibbsite and the boehmite in the desired weight ratio serve as the starting material and are subjected to a single dry thermal treatment in the air, without alkaline, hydrothermal treatment or addition of noble metals, so as to obtain multiphase alumina powder of the desired composition as the high-temperature catalytic material. Consequently, with respect to the requirement of components or formulas, the multiphase alumina powder of the present invention is more flexible than the prior art, and alternatively, it can be further obtained by mixing the multiphase alumina powders with various ratios, thereby reducing the process, energy source and cost. Furthermore, the high-temperature catalytic material of the present invention is still maintained at a high specific surface area ranging from 60 $m^2/g$ to 100 $m^2/g$ after being used at high temperature for a long time. Therefore, the high-temperature catalytic material of the present invention has overcome various disadvantages caused by the quickly decreased specific surface area due to the prior alumina catalytic material used in a high temperature environment for a long time, and the prior alumina catalytic material is far from this above advantage provided by the present invention. As the aforementioned description, the multiphase alumina powder of the present invention can replace the prior alumina catalytic material, so as to be applied as an excellent high-temperature catalytic material or catalyst monolith that is suitable for a higher temperature and a wider temperature range.

According to the aforementioned preferred embodiments, one advantage of the high-temperature catalytic material and the method for producing the same of the present invention utilizes a mixture of gibbsite and boehmite in a desired weight ratio to a single dry thermal treatment in the air, without alkaline, hydrothermal treatment or addition of noble metals, so as to obtain multiphase alumina powder of a desired composition as the high-temperature catalytic material. Since the multiphase alumina powders can raise the temperature of phase transformation, and make it capable of maintaining its high specific surface area when suffering high temperatures for a long time. Therefore, as the multiphase alumina powder of the present invention is applied as a high temperature catalytic material, it provides high specific surface area required of the catalysis, prolongs its lifetime, and is easy to obtain the starting materials, resulting in great reduction of the process time, energy and cost. As is understood by a person skilled in the art, the foregoing preferred embodiments of the present invention are illustrated of the present invention rather than limiting of the present invention. It is intended to cover various modifications and similar arrangements included within the spirit and scope of the appended claims. Therefore, the scope of that should be accorded the broadest interpretation so as to encompass all such modifications and similar structure.

What is claimed is:

1. A high-temperature catalytic material, comprising:
    multiphase alumina powder obtained by subjecting a mixture of gibbsite and boehmite in a weight ratio of 1:99 to 10:90 to a single dry thermal treatment, at 500-1100 degrees Celsius in air for 1 to 3 hours, without alkaline or hydrothermal treatment, and the multiphase alumina powder comprises:
        an α-phase alumina powder ranging from 1% to 10% by weight, wherein a particle size of the α-phase alumina powder is in a range from 50 nm to 200 nm;
        θ-phase alumina powder and δ-phase alumina powder and optionally γ-phase alumina powder, wherein the multiphase alumina powder has an amount of the θ-phase alumina powder and the δ-phase alumina powder and optionally γ-phase alumina powder ranging from 70% to 98% by weight in the multiphase alumina powder, and the multiphase alumina powder has an amount of the δ-phase alumina powder ranging from 20% to 40% by weight in the multiphase alumina powder; and
        κ-alumina powder and optionally x-phase alumina powder, wherein the multiphase alumina powder has an amount of the κ-phase alumina powder and optionally the x-phase alumina powder ranging from 1% to 20% by weight in the multiphase alumina powder, and
    wherein the α-phase alumina powder serves to suppress crystal growth of the θ-phase alumina powder, the κ-phase alumina powder serves to suppress phase transformation from the θ-phase alumina powder to the α-phase alumina powder, and the catalytic material is capable of a long-term usage under a high temperature of 700 degrees Celsius to 1000 degrees Celsius and being maintained at a specific surface area ranging from 60 $m^2/g$ to 100 $m^2/g$.

2. A method for producing a high-temperature catalytic material, comprising:
    providing a starting material, wherein the starting material comprises a mixture of gibbsite and boehmite in a weight ratio of 1:99 to 10:90; and
    subjecting the starting material to a single dry thermal treatment under 500 degrees Celsius to 1100 degrees Celsius in the air for 1 to 3 hours, without alkaline or hydrothermal treatment, so as to form multiphase alumina powder as the high-temperature catalytic material, wherein the high-temperature catalytic material comprises:
        an α-phase alumina powder ranging from 1% to 10% by weight, wherein a particle size of the α-phase alumina powder is in a range from 50 nm to 200 nm;
        θ-phase alumina powder and δ-phase alumina powder and optionally γ-phase alumina powder, wherein the catalytic material has an amount of the θ-phase alumina powder and the δ-phase alumina powder and optionally γ-phase alumina powder ranging from 70% to 98% by weight in the catalytic material, and the catalytic material has an amount of the δ-phase alumina powder ranging from 20% to 40% by weight in the catalytic material; and
        κ-phase alumina powder and optionally x-phase alumina powder, and wherein the catalytic material has an amount of the κ-phase alumina powder and optionally the x-phase alumina powder ranging from 1% to 20% by weight in the catalytic material, and
    wherein the α-phase alumina powder serves to suppress crystal growth of the θ-phase alumina powder, the κ-phase alumina powder serves to suppress phase transformation from the θ-phase alumina powder to the α-phase alumina powder, and the high-temperature catalytic material is capable of a long-term usage under a high temperature of 700 degrees Celsius to 1000 degrees Celsius and being maintained at a specific surface area ranging from 60 $m^2/g$ to 100 $m^2/g$.

3. The method for producing the catalytic material according to claim 2, wherein the starting material comprises a mixture of gibbsite and boehmite in a weight ratio of 5:95.

* * * * *